May 2, 1950 E. P. KORN 2,506,366
LAWN EDGER
Filed Feb. 12, 1945

Inventor
Estol P. Korn
By
E. V. Hardway,
Attorney

Patented May 2, 1950

2,506,366

UNITED STATES PATENT OFFICE 2,506,366

LAWN EDGER

Estol P. Korn, Houston, Tex.

Application February 12, 1945, Serial No. 577,570

2 Claims. (Cl. 30—292)

This invention relates to an edger.

An object of the invention is to provide an implement of the character described specially designed for use in trimming the edge of a lawn adjacent a curb or side walk.

Another of the invention is to provide an implement of the character described embodying a concavo-convex disc having a sharp cutting edge which is rotatably mounted on a handle, in combination with a supporting wheel arranged on the concave side of the disc and adapted to run on the curb or sidewalk to support the implement and to regulate the depth of the cut.

It is another object of the invention to provide an implement of the character described having a foot rest on one side of the handle whereby the required pressure may be applied to the disc by the operator with the handle curved in a direction the opposite of that of the foot rest so as to enable the operator to walk along the sidewalk while operating the implement.

With the above, and other, objects in view the invention has particular relation to certain novel features of construction, arrangement of parts and use an example of which is given in this specification and illustrated in the accompanying drawings, wherein.

Figure 1:
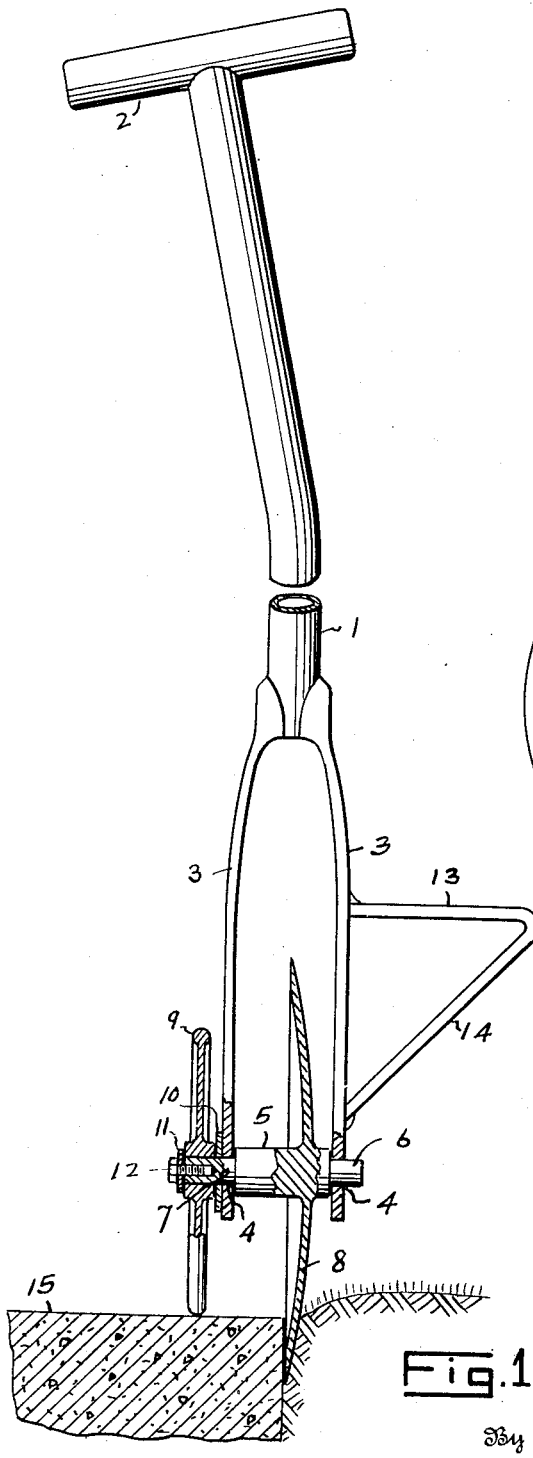
Figure 1 shows a front elevation partly in section.
Figure 2:
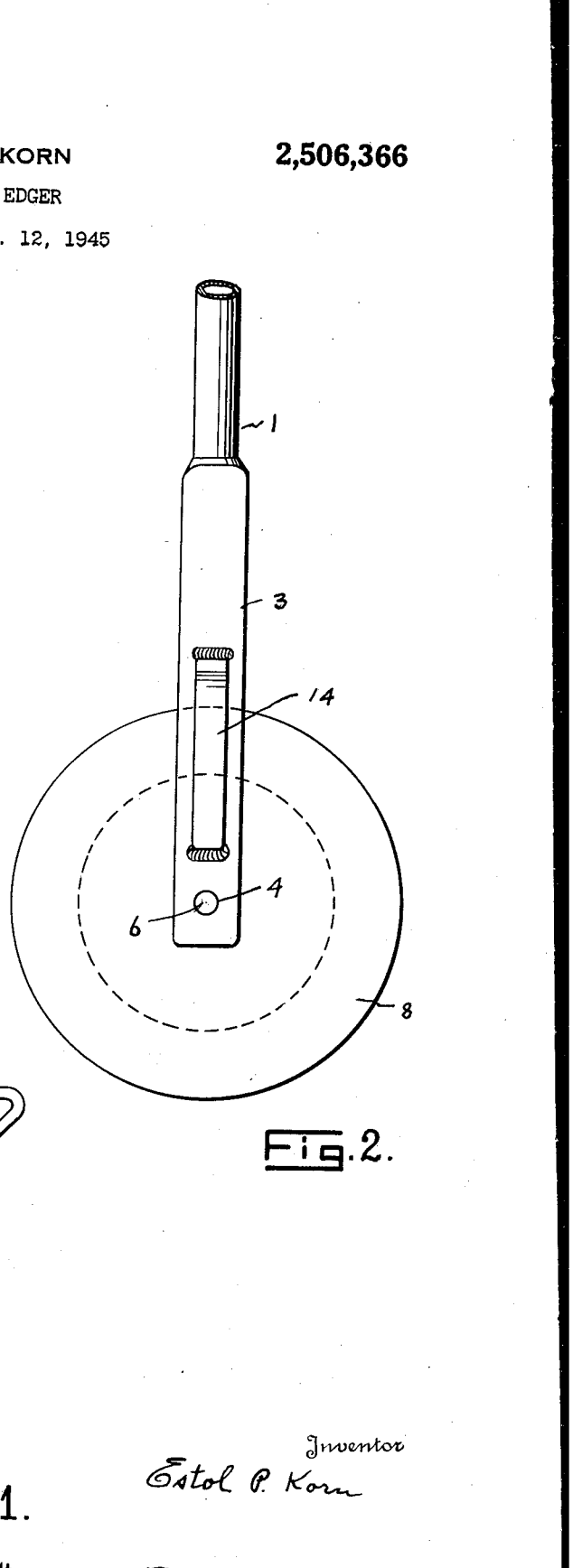
Figure 2 shows a fragmentary side view.

In the drawings the numeral 1 designates the handle to the outer end of which the transverse grip member 2 is secured.

The handle also includes the spaced, flat bars 3, 3 whose free ends are provided with the transversely aligned bearings 4, 4.

Mounted to rotate between the bars 3 there is the axle 5 having the reduced spindles 6, 7 which rotate in the bearings 4 with the ends of the axle abutting the inner sides of the bars 3, 3.

Fixed on the axle 5 there is a concavo-convex disc 8 having a sharp cutting edge.

The spindle 7 is extended beyond the corresponding side bar 3 and mounted to rotate on said extended end is the supporting wheel 9. It is mounted between the inner and outer washers 10 and 11 the former of which is fitted over said spindle and the latter of which is clamped against the outer end of the spindle by the clamp bolt 12.

The disc 8 is of somewhat greater diameter than that of the wheel 9 so that the disc will have sufficient penetration.

Secured on the bar 3, which is opposite the wheel 9, there is a foot rest comprising the horizontal portion 13 which is braced by the diagonal portion 14 as shown in Figure 1.

As clearly indicated in Figure 1 the handle is bowed, or curved, oppositely from the foot rest so as to position the grip member 2 directly above the side walk 15 when the implement is in use. The operator can thus more easily walk along the side walk while operating the trimmer, as illustrated in Figure 1. The concave side of the disc 8 will be adjacent the edge of the side walk when the implement is in use and the operator can, by gripping and pulling upwardly on the outwardly bowed portion of the handle, hold the forward edge of the disc closely against the adjacent edge of the walk and the disc will thus not only trim the lawn close to the side walk but will be self sharpening.

In operation the operator may maintain one foot on the foot rest 13 and thus hold the disc firmly to the work as the implement is propelled along.

The drawings and description are illustrative, merely which the broad principle of the invention will be defined by the appended claims.

What I claim is:

1. An edger comprising, a curved handle, a grip member fixed to one end of the handle, the other end of the handle including spaced, flat side bars which are spaced apart and whose free ends are provided with transversely aligned bearings, an axle mounted to rotate between said bearings and having reduced end spindles which rotate in said bearings with the ends of the axle abutting said bars, a concavo-convex disc fixed on the axle and having a sharp cutting edge, one of said spindles extending beyond the corresponding side bar, a supporting wheel mounted to rotate on the extended end of said spindle, a footrest secured on the other bar and on the outer side of the handle, with respect to the handle curvature, and extended outwardly in a common plane with the axle, said foot rest comprising a horizontal portion and a diagonal portion beneath the horizontal portion whose upper end is formed integrally with the horizontal portion and whose lower end is secured to the corresponding side bar.

2. An edger comprising, a handle which is bent laterally at a point approximately midway between its ends, a grip member fixed to one end if the handle, the other end of the handle including spaced side bars whose free ends are provided with transversely aligned bearings, an axle mounted to rotate between said bearings and whose ends form spindles which work in the bearings, a concavo-convex disc fixed on the axle and having a sharp cutting edge, one of said spindles extending beyond the corresponding side bar, a supporting wheel mounted on the extended end of said spindle, a foot rest secured on the other bar and on the outer side of the handle, with respect to the handle curvature, and extended outwardly in a common plane with the axle.

ESTOL P. KORN.

REFERENCES CITED

The following references are of record in the file of this patent:

UNITED STATES PATENTS

| Number | Name | Date |
|---|---|---|
| 440,879 | Jackson | Nov. 18, 1890 |
| 1,181,281 | Albert | May 2, 1916 |
| 1,266,617 | Parsons | May 21, 1918 |
| 1,770,434 | Schleicher | July 15, 1930 |
| 1,856,435 | Schwarz | May 3, 1932 |
| 1,964,366 | Schwarz | June 26, 1934 |